Oct. 30, 1951 W. ROWE ET AL 2,573,278
PHOTOGRAPHIC APPARATUS
Filed March 21, 1947 4 Sheets-Sheet 1

INVENTORS.
CYRUS M. ADLER
WALTER ROWE
BY
Greene & Durr
ATTORNEYS

Oct. 30, 1951   W. ROWE ET AL   2,573,278
PHOTOGRAPHIC APPARATUS
Filed March 21, 1947   4 Sheets-Sheet 2

Fig. 2

INVENTORS.
CYRUS M. ADLER
WALTER ROWE
BY
Greene & Durr
ATTORNEYS

Oct. 30, 1951 W. ROWE ET AL 2,573,278
PHOTOGRAPHIC APPARATUS
Filed March 21, 1947 4 Sheets-Sheet 3
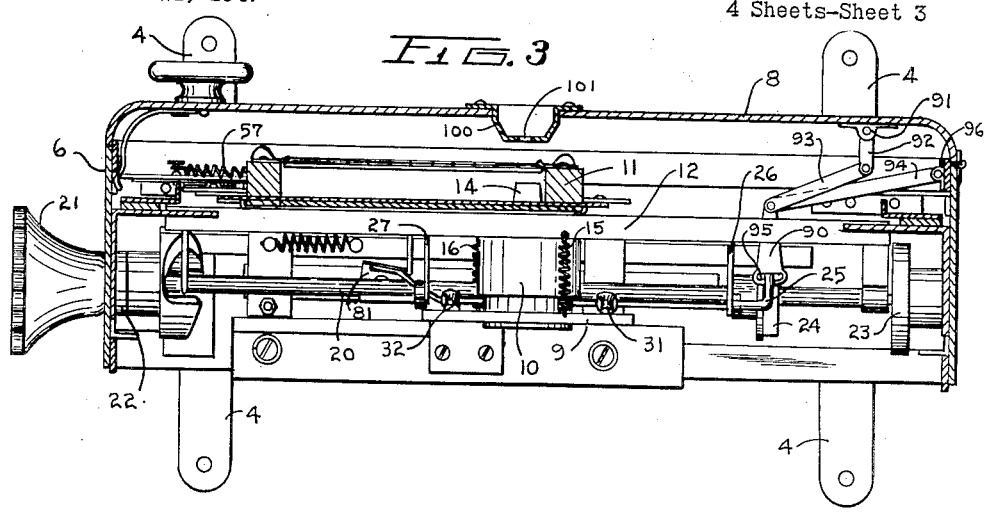
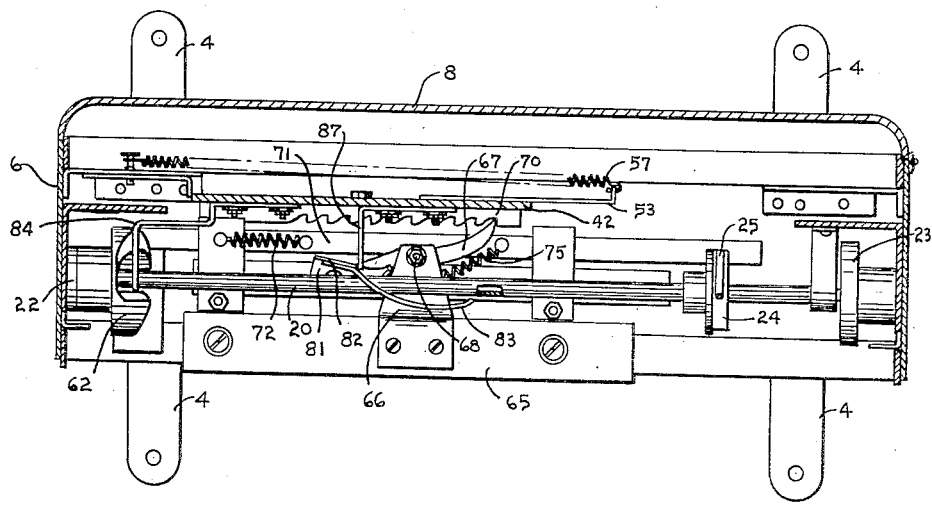
INVENTORS
CYRUS M. ADLER
WALTER ROWE
BY
ATTORNEYS

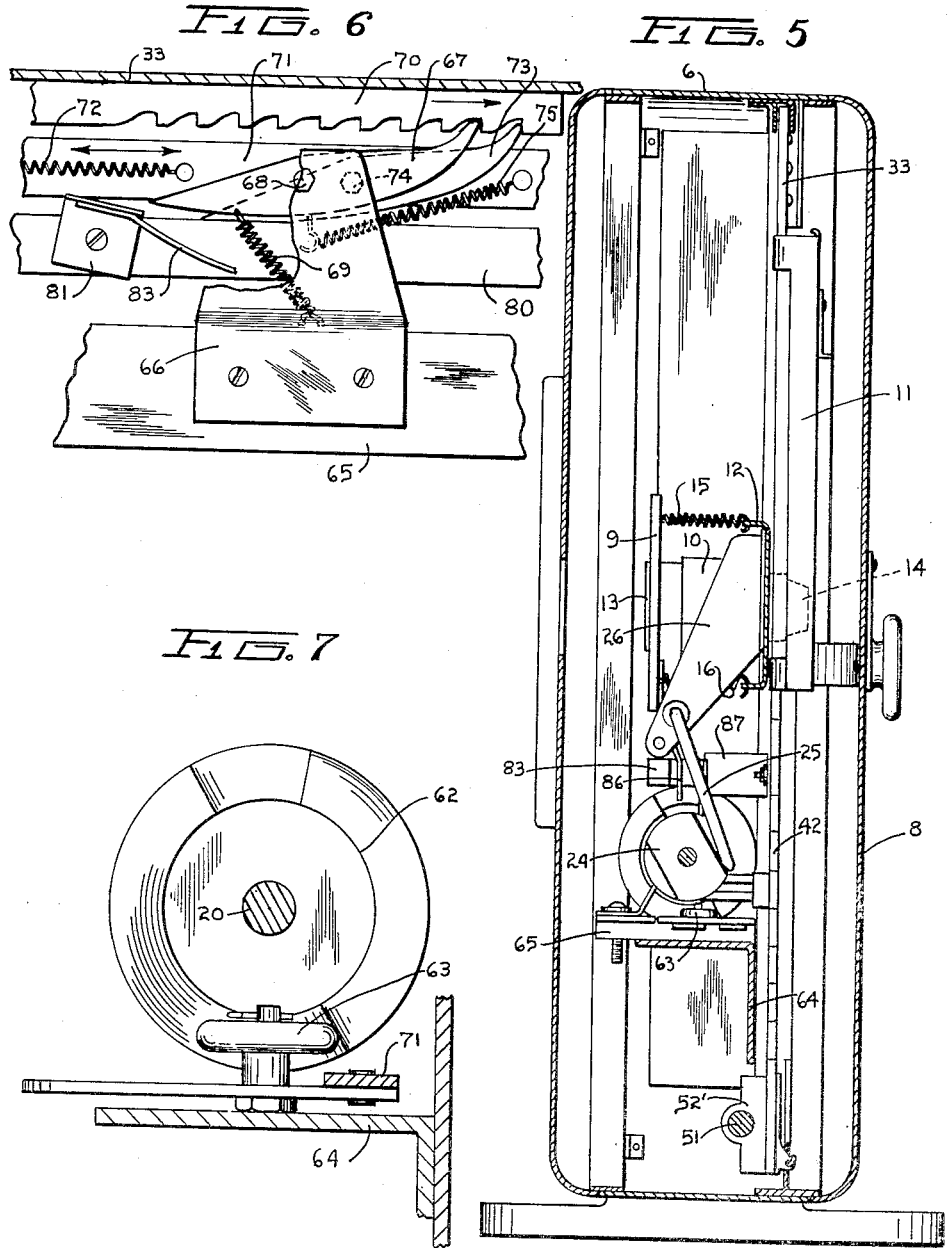

Patented Oct. 30, 1951

2,573,278

UNITED STATES PATENT OFFICE 2,573,278

PHOTOGRAPHIC APPARATUS

Walter Rowe, New York, N. Y., and Cyrus M. Adler, Beverly Hills, Calif., assignors to Cinex, Inc., New York, N. Y., a corporation of New York Application March 21, 1947, Serial No. 736,132

4 Claims. (Cl. 95—37)

This invention relates to photographic apparatus, more particularly to an apparatus for microphotographing a plurality of separate images such as printed sheets and so forth in a plurality of rows upon a single sheet of sensitized material.

In Patent No. 2,228,183 there is disclosed a process and apparatus for photographing a number of images in a plurality of rows upon a single sheet of sensitized material. According to this patent a lens assembly device which comprises a lens and a light-excluding tube is held so that the end of the light-excluding tube is in direct contact with the sensitized material. A means is provided for moving the lens assembly out of contact with the sensitized material while the sheet of sensitized material is being moved relative to the lens assembly. According to this patent the sensitized sheet is moved, for example, first from right to left to take one row of pictures, is then moved in a vertical direction and is subsequently moved from left to right to take the next row of pictures. This invention is an improvement on the device of Patent No. 2,228,183 and involves a new method and means for moving the holder carrying the sensitized film.

An object of this invention is to provide a lens assembly device in combination with a shifting sheet of sensitized material in which the lens assembly is held under tension against the sensitized material at the correct focal distance and in which means are provided for moving the lens assembly automatically but of contact with the film while the film is shifting.

Another object of the invention is to provide a means for taking a large number of microphotographs on a single sheet of sensitized material, said photographs being taken in a plurality of horizontal and vertical rows and in which the images in each horizontal row progress in the same direction on the film.

Another object of the invention is to provide a light excluding tube in which a lens is mounted and which is held under tension against a film or other sensitized material and a novel means for moving the tube out of contact with the film when the film carrier and film are to be moved.

Another object of the invention is to provide means for taking pictures in a plurality of horizontal rows on a single sensitized material with a lens device which contacts the sensitized material and of providing a means for shifting the sensitized material back to its original horizontal position when the end of a row is reached and further providing means for holding the lens assembly away from the sensitized material during the shifting operation.

Another object of the invention is to provide a means for microphotographing a progression of images in which the continuity proceeds in a horizontal direction to the end of the row and then shifts back to a position adjacent the first exposure in the next vertical row and then moves in the same horizontal direction as in the first series of horizontal exposures.

These and other objects ancillary thereto are obtained by providing a camera with a lens assembly which comprises a lens and a spacing means with a tubular light-excluding shield, the end of which is adapted to press upon the light sensitive material, together with a film or plate carrier of the size adapted to contain a large number of exposures and with means to move the film or plate carrier a space at a time in one direction until all the spaces in that direction have been used, and to move the film carrier to the next row of spaces and into a position to take the next exposure at a point adjacent the first exposure in the preceding row. An essential feature of the invention relates to the means which are provided to move the light-excluding tube out of contact with the plate or film while the latter is being shifted. Means are also provided to move a tubular shield out of contact with the film when the back of the camera is opened.

The lens assembly referred to, which comprises the lens and the tube, is in one compact unit and since it is spring pressed against the sensitized material the lens is always in fixed spaced position with reference to the sensitized material. Thus, the lens is always in focus regardless of the resistance offered by the film pack, regardless of wrinkles or distortions which might appear in the film and regardless of variations which may occur in the resistance of a film pack. When the end of a light-excluding tube is not in contact with the sensitized material these advantages are not present. By employing a spring-pressed lens assembly device in the taking of microphotographs the individual photographs may be closely spaced since there is no diffusion of light between the end of the light-excluding tube and the sensitized material.

An essential feature for photographing pages which progress in a predetermined order is a provision by which the progression of each horizontal row proceeds in the same direction. For example, according to Patent No. 2,228,183 referred to above, a first row of pictures is taken from left to right and in the next succeeding row the progression moves from right to left. Where ten vertical rows of pictures are used according to the present invention, all the pages of a manuscript which end in the same digit will appear in the same vertical row.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 2 is a rear view of the camera with the rear door opened.

Figure 3 is a cross-sectional view taken on line 3—3 of Figure 1.

Figure 4 is a cross-sectional view taken on line 4—4 of Figure 1.

Figure 5 is a cross-sectional view taken on line 5—5 of Figure 1.

Figure 6 is a detail view taken on line 6—6 of Figure 1.

Figure 7 is a detail view taken on line 7—7 of Figure 1.

Figure 1:
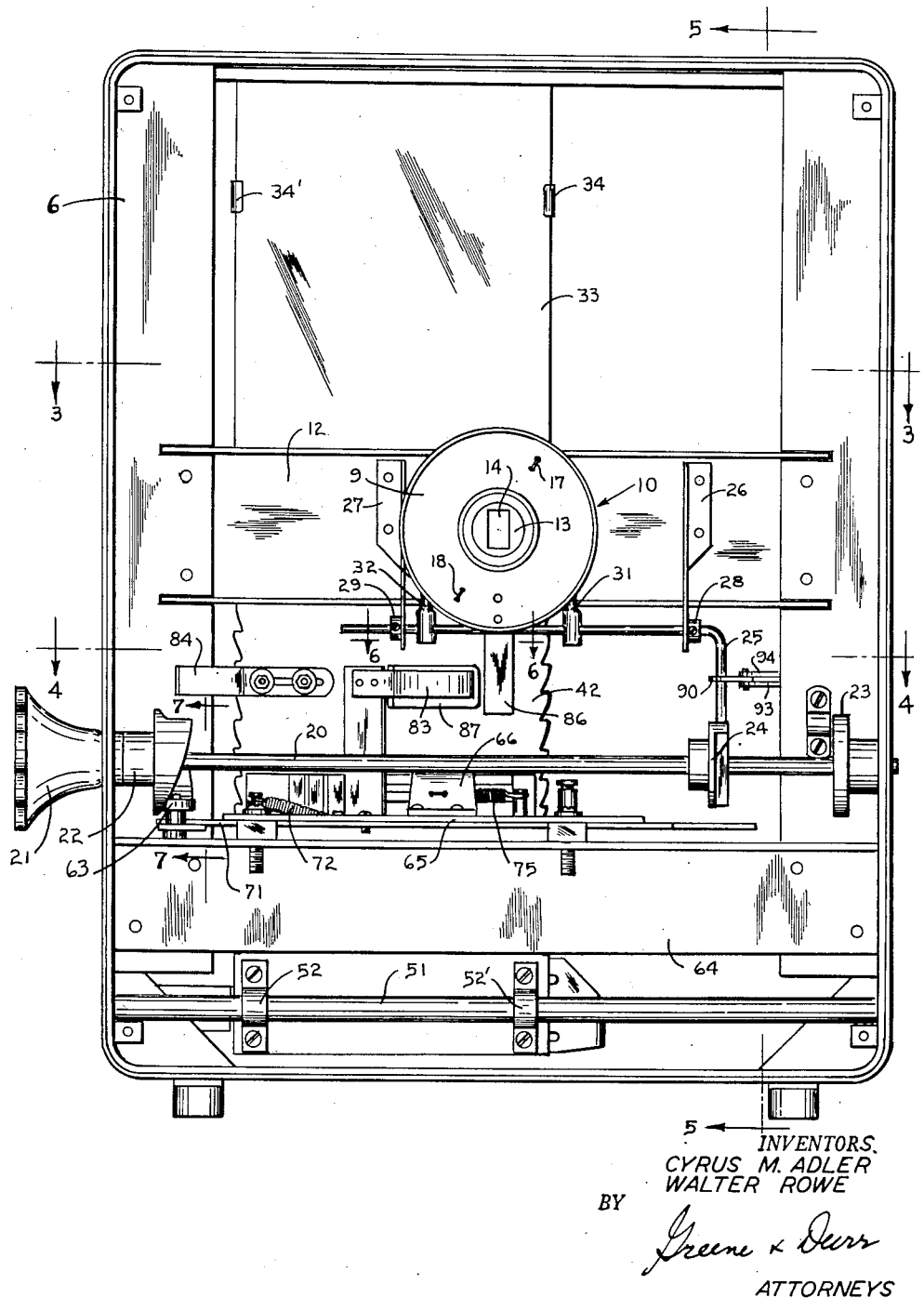
Figure 1 is a front view of the camera with the cover and shutter removed.

In the drawings the camera is shown as being supported by braces 4 and as comprising a rim 6, a hinged back 8, and a front plate 7 containing a shutter 5. The lens assembly is shown at 10 and the film carrier at 11. A cross support 12 is provided to slidably hold the lens assembly device. This cross support 12 contains an orifice, not shown, through which the tubular shield 14 of the lens assembly extends. The lens assembly 10 comprises the lens 13, an outer rim 9 about the lens and, in fixed spaced relation to the lens, the light excluding shield 14. The lens 13 is adjustably screwed into a threaded orifice in the rim 9 so that the focus of the lens can be adjusted or changed as desired. Springs 15 and 16 are attached at 17 and 18 to the rim 9 and at the other end to the cross support 12. This provides means for forcing the light-excluding tube 14 through orifices in the cross support and the film carrier and against the film. In Figure 3 the film pack is not inserted into the film carrier 11 and the shield 14 is, therefore, shown in its most inward position. Depending upon the thickness of the film pack the position of the shield 14 during the photographing process will be further toward the front than is shown at Figure 3. The distance between the lens and the sensitive film is always the same because of the spacing means which includes the shield 14.

For releasing the lens assembly from its contact with the sensitized material while the film carrier and film are to be shifted horizontally the following means is provided. The shifting means is operated by a shaft 20 which may be rotated by a handle (knob) 21 or which may be motor driven. The shaft 20 rotates in bearings 22 and 23 and contains the cam 24. An angle rod 25, one leg of which acts as a cam follower against the cam surface of 24 and the other leg of which is adapted to rotate in bearings 28 and 29 held by brackets 26 and 27, contains arms 31 and 32 for bearing against the rim 9 of the lens assembly. Rotation of the shaft 20 causes the arms 31 and 32 to push the lens assembly 10 away from the film.

The film carrier and its shifting device will now be described. The film carrier 11 is held in its vertical position by a movable plate which comprises an upper part 33. The film holder is held to the plate by the clamps 34 and 34'. The plate 33 also includes an orifice through which the shield 14 extends. As shown in Figure 2, the film carrier contains the door 35 held in place by clamps 37 and 37' and hinged at 36. Flanges project from the side of the film carrier and are shown at 38 and 39. A pair of spring pressed pawls 40 and 41 are pivotally attached to the flanges 38 and 39. The lower portion 42 of the plate 33 has ratcheted sides as shown at 60 and 60'. The pawls 40 and 41 are pivoted at 43 and 44 respectively and have extending ends 45 and 46. These extending ends 45 and 46 are adapted to be pressed by the sides of angle plates 47 and 48 which are held at the sides of the apparatus. The plate 33 is slidable in a groove at the top of the camera and has bearings 52 and 52' adapted to slide along the shaft 51 located at the bottom of the camera. An adjustable spring holding plate 53 is shown at the bottom of Figure 2. This plate contains slots 54 and 54' and is held by bolt assemblies 56 and 56'. The spring 57 attached to the spring holding plate 53 tends to move the plate to the right as shown at Figure 2. The notches on the ratchets 60 and 60' do not coincide. When the film holder is moved all the way to the left the pawl 40 will release so that the film carrier falls enough to release the said pawl 40. The carrier is then held in position by pawl 41. When the film carrier moves back to the position shown at Figure 2, the pawl 41 will be released and the film carrier will fall the remaining distance.

The mechanism for moving the film carrier 33 horizontally will now be described. As shown in Figure 4, for example, the film carrier is forced resiliently toward the left by the spring 57. This carrier is forced toward the right and held in proper position by a ratcheted mechanism which is shown in Figures 1, 4, 6 and 7. Located on the shaft 22 is another cam 62. A cam follower 63 (see Figures 1 and 7) attached to a movable bar 71 is provided. An angle member 64 extends across the lower part of the camera. A stationary bar 65 is attached at 64 and this contains a flange 66 extending to a film carrier. To the end of the flange 66 a pawl 67 is pivotally attached at 68. This pawl tends to rotate counterclockwise because of the action of the spring 69. On the film carrier there is located a ratchet bar 70 against which the end of the pawl 67 presses. On the cam moved bar 71 there is pivotally mounted at 74 a second pawl 73. This pawl 73 is also pressed against the ratchet 70 by means of the spring 75. The bar 71 is moved to the right, as shown in Figure 6, by the action of the cam 62 and is returned to the left by the action of the spring 72. Rotation of the shaft 20 causes the cam 62 to move the bar 71 to the right, as shown in Figure 6, thereby pushing the carrier plate 33 to the right one notch. The pawl 67 holds the carrier plate in position while the rod 71 returns the pawl 73 preparatory to making the next horizontal shift.

The number and shape of the cam surfaces on 62 are correlated with the cam surfaces of 24 so that each movement of the film carrier is preceded by a retraction of the lens assembly. However, the time in which the lens assembly is retracted by the cam 24 is not of sufficient length to permit the complete return of the plate when the last picture in any individual horizontal row has been taken. To secure the advantages applicant desires it is necessary to return the plate completely so that the pages of a manuscript, for example, will always proceed in the same direction. To provide for this contingency the following mechanism has been devised. A loosely sliding bar 80 adjacent to bar 71 (see Figure 6, for example) is provided. Mounted on this bar at an angle is the angle piece 81. This piece 81 is mounted on the bar 80 at an acute angle to the movement of the bar 71 as shown at 82 so that if the bar 80 is moved past the ends of the pawls 67 and 73 it will lift the pawls out from the ratchet bar 70. The upper end of the angle member 81 contains a curved extension 83 (see Figure 4, for example). The lower part of the lens assembly contains an extension 86 (see Figure 1). Mounted on the left hand side of the plate, as shown in Figure 1, is another member 84 which has a projecting edge adapted to contact the angle member 81 after the plate has reached its last position. Thus, after the last picture in the row has been taken the shaft 20 is turned thereby retracting the lens assembly and the projecting member 84 moves the angle member 81 so that 83 passes under the projection 86. Simultaneously the surface 82 of the angle member 81 depresses both pawls 67 and 73 releasing the plate so that it snaps back to the position shown in Figures 3 and 4, for example. Attached to the plate 33 is another angle piece 87 which is adapted to push the angle member 81 and the extending portion 83 away from the projection 86 of the lens assembly thereby releasing the lens assembly so that it will again press against the sensitized material and also releasing the pawls 67 and 73.

Means are also shown for retracting the lens assembly when the rear door is opened preparatory to changing the sensitized material. The emulsion could easily be scratched by the tube 14 if the latter is not retracted therefrom. Such retracting means is shown in Figure 3 and comprises several loosely mounted links. The door 8, for example, has a projecting ear 81 mounted thereon. On this ear is pivotally mounted a link 92 and loosely mounted to link 92 is link 93. To the end of link 93 is a slotted means 90 for pulling out the cam follower 25. In this slotted link 90 the slot 95 is elongated so that the rod 25 will not be displaced horizontally. In order to keep the pull of the device as nearly in a straight line as is possible a link 94 is attached to the side 6 by means of the ear 96. Preferably the combined lengths of the links 92 and 93 are such that they do not begin to act upon 25 until the door is at least part way opened. Two links 92 and 93 are employed because this permits the free movement of the slot piece 90 with the rod 25 when the door is closed.

A preferred order in which the photographs are taken is indicated by numbers on the back 35 in Figure 2. Thus, the device shown in Figure 2 is adapted to take 100 microphotographs and has a space at the bottom thereof which provides for indexing. If desired the back portion 8 may contain a small indented circular device 100 which is aligned with the lens assembly which contains a hole 101 so that one can see the number of the photograph being taken.

Although certain specific embodiments of this invention have been shown and described, it will be understood that many modifications thereof are possible. This invention, therefore, is not to be restricted except insofar as is necessitated by the prior art and by the spirit of the appended claims.

We claim:

1. In a camera for exposing a number of separate areas of a light sensitive sheet in sequence, the separate areas being aligned in a plurality of horizontal rows, said camera having a lens assembly comprising a lens and spacer means including a light excluding tubular shield, fixedly attached to said lens at one end and adapted to bear against the sensitive material at the other end and means for resiliently forcing the lens assembly toward the sensitized material, the improvement which comprises a carrier for the sensitized material, a plate adapted to move horizontally and adapted to hold the sensitized-material carrier in a plurality of vertical positions, a plurality of horizontally arranged ratchet stops on said plate, resilient means tending to force the plate in one horizontal direction, a first and horizontally movable pawl means for registering with said horizontally arranged ratchet stops, means for moving the pawl means to force the plate to move against the action of the resilient means, a second and stationary pawl means registerable with said ratchets adapted to hold the plate in any one of a number of horizontal positions a rotatable shaft having a first cam thereon adapted to move the lens assembly away from the sensitive sheet, a second cam adapted to move said first pawl means horizontally the distance of one row after the first cam has moved the lens assembly away from the sensitive sheet, and means actuated when said plate is moved past the last horizontal position adapted to disengage said pawls and hold the lens assembly out of contact with said sensitive sheet until the said plate together with the sensitized sheet carrier is moved all the way back to the first horizontal stop.

2. In a camera for exposing a number of separate areas of a light sensitive sheet in sequence, the separate areas being aligned in a plurality of horizontal rows, a lens assembly comprising a lens and spacer means including a light excluding tubular shield fixedly attached to said lens at one end and adapted to bear against the sensitive material at the other end, means for forcing the lens assembly resiliently toward the sensitized material, rotatable means for moving the lens assembly away from the sensitized material and simultaneously shifting the sensitized material to the next horizontal position, a hinged door, means on said door to automatically move the lens assembly out of contact with the sensitized material when the door is opened so that the sensitized material can be removed from or inserted into the camera without being scratched by said shield.

3. In a camera for exposing a number of separate areas of a light sensitive sheet in sequence, the separate areas being aligned in a plurality of horizontal rows, a lens assembly comprising a lens and spacer means including a light excluding tubular shield fixedly attached to said lens at one end and adapted to bear against the sensitive material at the other end, means for forcing the lens assembly resiliently toward the sensitized material, a carrier for the sensitized material, a plate adapted to move horizontally and adapted to hold the sensitized-material carrier in a plurality of vertical positions, a hinged door adjacent the film holder, means on said door to move the lens assembly out of contact with the sensitized material when the door is opened so that the sensitized material can be removed from or inserted into the camera without being scratched by said shield.

4. In a camera for exposing a number of separated areas of a flat light sensitive sheet in sequence, the sepaarte areas being aligned in a number of horizontal and vertical rows, the said camera having a peripheral rim, a centrally located lens assembly comprising a lens and spacer means including a light excluding tubular shield fixedly attached to the said lens at one end and adapted to bear against one of the separated areas of the light sensitive sheet at the other end, a carrier for the light sensitive sheet material and means for resiliently forcing the lens assembly toward the sensitized material, the improvement which comprises a plate adapted to move horizontally and adapted to hold the carrier in a number of vertical positions, resilient means tending to hold said plate at one extreme horizontal position, stationary bar means associated with the said peripheral rim, a ratchet-pawl connection between the stationary bar and the movable plate whereby the plate will be held in any one of a number of horizontal positions corresponding to the number of vertical rows of photographs to be made in said light sensitive sheet when the plate is moved against the action of said resilient spring, a rotatable shaft having a first cam associated therewith adapted to move the lens assembly away from the sensitive sheet and hold the lens assembly away from the sheet for a part of the time required for each revolution of the shaft, said rotatable shaft having a second cam associated therewith adapted to move the said plate one step against the action of the resilient member after the lens assembly is moved away from the sheet by the first cam whereby the said ratchet-pawl means holds the plate at the new position, and means activated when the plate is moved past the last vertical row adapted to disconnect the pawl-ratchet means and hold the lens assembly away from the light sensitive material until the plate is moved all the way back to the first position by said resilient means.

WALTER ROWE.
CYRUS M. ADLER.

REFERENCES CITED

The following references are of record in the file of this patent:

UNITED STATES PATENTS

| Number | Name | Date |
| --- | --- | --- |
| 1,991,578 | Rixen | Feb. 19, 1935 |
| 2,106,814 | Romer | Feb. 1, 1938 |
| 2,172,283 | Kirby | Sept. 5, 1939 |
| 2,275,519 | Friedericks | Mar. 10, 1942 |
| 2,356,363 | Thompson | Aug. 22, 1944 |

FOREIGN PATENTS

| Number | Country | Date |
| --- | --- | --- |
| 811,196 | France | Jan. 14, 1936 |